United States Patent [19]

Streeter

[11] 3,768,651

[45] Oct. 30, 1973

[54] AQUARIUM FILTER

[76] Inventor: Warren D. Streeter, 6590 MacArthur Dr., Lemon Grove, Calif.

[22] Filed: Sept. 22, 1971

[21] Appl. No.: 182,709

[52] U.S. Cl. ............................... 210/169, 210/195
[51] Int. Cl. ............................................. E04h 3/20
[58] Field of Search ................ 210/169, 195; 119/3, 119/5

[56] References Cited
UNITED STATES PATENTS

| | | | |
|---|---|---|---|
| 3,566,840 | 3/1971 | Willinger | 119/5 |
| 3,638,795 | 2/1972 | Fedders et al. | 210/169 |
| 3,145,168 | 8/1964 | Scafuro | 210/169 |

Primary Examiner—Frank A. Spear, Jr.
Assistant Examiner—T. A. Granger
Attorney—Richard K. Macneill

[57] ABSTRACT

An aquarium filter dimensioned for resting on the top rear portion of an aquarium in which unfiltered water from the aquarium tank is pumped into first and second end fittings which communicate with first and second end compartments, being separated by a removable recessed center box. The first and second end compartments contain filter wool and communicate with the removable box through a plurality of apertures in each side of the removable center box, the box being filled with charcoal. A riser tube rises through the charcoal in the central removable box and communicates with the aquarium tank forming an exhaust thereto after the filtering.

1 Claim, 2 Drawing Figures

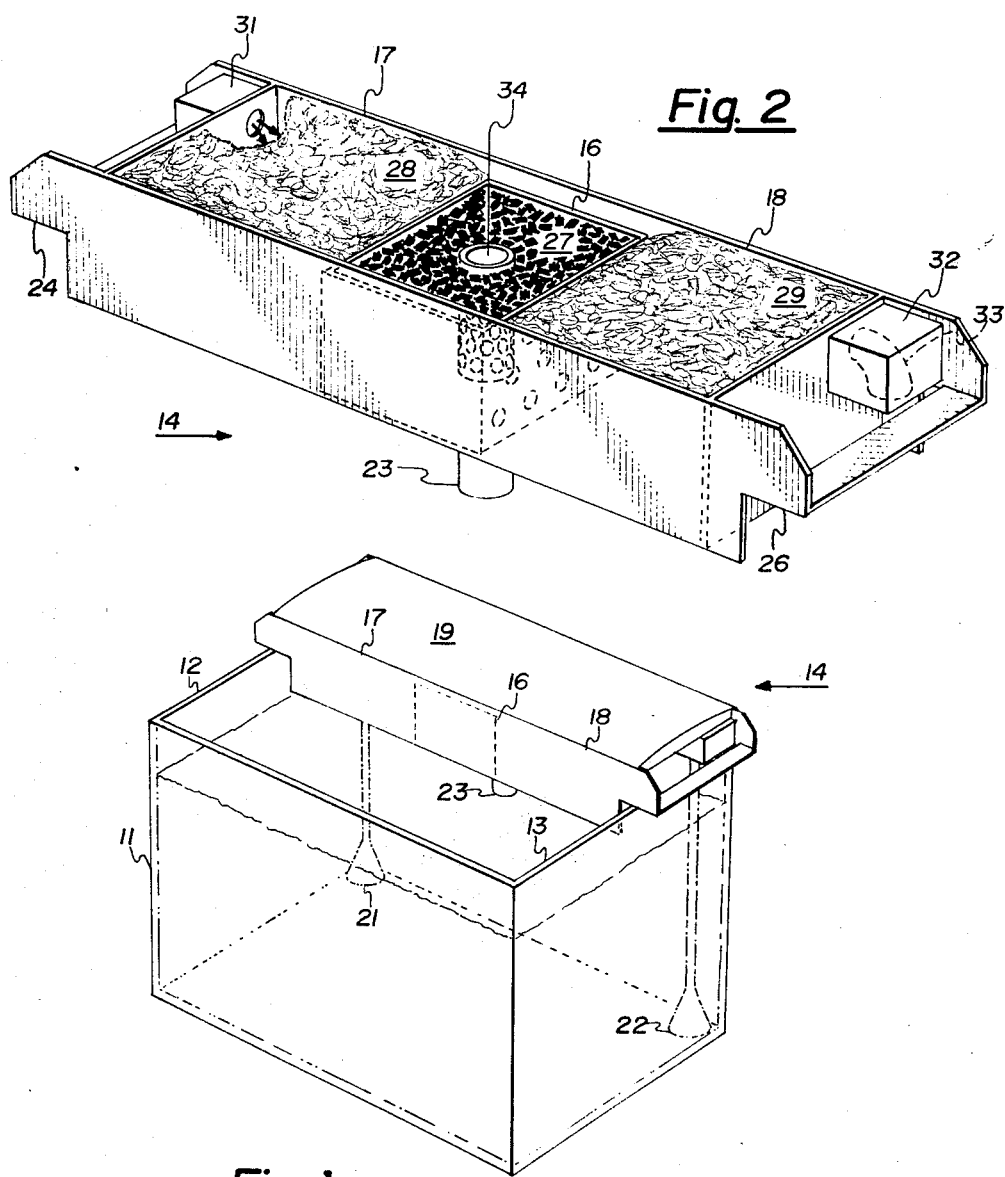

AQUARIUM FILTER

BRIEF DESCRIPTION OF THE INVENTION

The present invention relates to an aquarium filter and more particularly to an aquarium filter having a removable charcoal portion therein.

According to the invention, an aquarium filter is provided which is dimensioned for being carried by each side of an aquarium at the back portion thereof forming a partial cover. The filter has first and second sections filled with filter wool which are separated by a central removable box containing charcoal. The sides of the central box are perforated with a plurality of apertures which place the box in communication with the outside filter wool sections. The box is partially filled with charcoal and contains a riser which is also perforated with apertures and communicates with the bottom of the filter as an exhaust for the filtered water. The riser prevents any charcoal from falling into the aquarium and tank. The entire filter unit is preferably dimensioned for replacing the back portion of the cover of a conventional aquarium thereby forming a partial cover itself. Each end of the filter has a hose fitting for pumping water into the outside sections which are filled with filter wool.

An object of the present invention is the provision of an improved aquarium filter.

Another object of the invention is the provision of an aquarium filter having intakes from each end thereof.

Yet another object of the invention is the provision of an aquarium filter having both filter wool and charcoal sections.

A further object of the invention is the provision of an aquarium filter having a removable charcoal section.

A still further object of the invention is the provision of an improved aquarium filter which forms a partial cover for an aquarium.

Other objects and many of the attendant advantages will be readily appreciated as the same becomes better understood by reference to the following detailed description when considered in connection with the accompanying drawings in which like reference numerals designate like parts throughout the FIGS thereof and wherein:

FIG. 1 is a perspective view of the preferred embodiment of the present invention in situ; and FIG. 2 is a perspective view of the preferred embodiment of the invention in more detail.

DETAILED DESCRIPTION OF THE DRAWING

Referring to FIG. 1, an aquarium is shown generally at 11 having sides 12 and 13. A filter is shown generally at 14 having a recessed box 16 and a central portion thereof defining outside sections 17 and 18 all of which are covered by a removable top 19. Filter 14 rests on the back top edges of sides 12 and 13. Pumps 21 and 22 are in communication with the ends of filter 14. A drain 23 communicates between removable box 16 and the inside of aquarium 11.

Referring to FIG. 2 aquarium 14 is again shown having outside sections 17 and 18 separated by a removable box 16. The ends 24 and 26 of filter 14 are dimensioned for resting on the top of an aquarium's sides. Removable box 16 is recessed slightly and is filled with charcoal 27. Removable box 16 defines sections 17 and 18 which are filled with filter wool indicated at 28 and 29. Hose fittings 31 and 32 are adapted for receiving unfiltered pumped water from the aquarium and communicate with filter wool sections 17 and 18. A fitting channel 33 is shown in dotted lines through fitting 32. Ends 24 and 26 have suitable open spaces adjacent fittings 31 and 32 for neater insertion, etc. Removable box 16 has a riser 34 which is perforated and terminates in an exhaust 23 to an aquarium. Sides of removable box 16 are perforated for communication with sections 17 and 18.

Referring back to FIGS. 1 and 2, it can be seen that unfiltered water is pumped through pumps 21 and 22 into filter wool sections 17 and 18, through the apertures in removable box 16 and charcoal 27 and back through riser 34 to exhaust 23. When it is desired to clean or replace the charcoal, removable box 16 is merely taken out of the filter and the charcoal replaced, after which box is replaced in the filter. Obviously, the entire unit is easily accessible and can be utilized with existing under gravel filter lines in the appropriate installations.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. Sole: An aquarium filter dimensioned for resting on the top rear portion of an aquarium comprising:
   an aquarium tank;
   first and second end compartments containing filter wool, said end compartments located at a top portion of said tank and at opposite ends thereof;
   first and second end fittings disposed outside of said first and second end compartments, respectively, said first and second fittings communicating with said first and second end compartments, respectively
   first and second pumps disposed at a bottom portion of said tank and at opposite ends thereof beneath said first and second fittings and coupled thereto;
   a center compartment filled with charcoal disposed between said first and second compartments, and communicating therewith; and
   exhaust means coupling said center compartment with said aquarium tank.

* * * * *